United States Patent [19]
Buchwald et al.

[11] Patent Number: 5,102,469
[45] Date of Patent: Apr. 7, 1992

[54] DICHLOROPENTAFLUOROPROPANE-CONTAINING COMPOSITIONS FOR REMOVING WATER FROM SURFACES

[75] Inventors: Hans Buchwald, Ronnenberg; Andreas Brackmann, Hanover; Boleslaus Raszkowski, Wiedensahl, all of Fed. Rep. of Germany

[73] Assignee: Kali-Chemie AG, Hanover, Fed. Rep. of Germany

[21] Appl. No.: 661,307

[22] Filed: Feb. 27, 1991

[30] Foreign Application Priority Data

Feb. 28, 1990 [DE] Fed. Rep. of Germany ....... 4006191

[51] Int. Cl.⁵ ................................................. B08B 3/08
[52] U.S. Cl. .............................. 134/22.14; 134/22.19; 252/172; 570/134
[58] Field of Search ................. 134/22.14, 22.19; 570/134; 252/172

[56] References Cited

U.S. PATENT DOCUMENTS 3,332,840  7/1967  Regan ................................. 370/134
3,585,245  6/1971  Regan ................................. 570/134
4,980,324 12/1990  Kellner et al. ..................... 570/134

FOREIGN PATENT DOCUMENTS 0078925  6/1985  Japan ................................... 570/134
2209824  8/1990  Japan ................................... 570/134

Primary Examiner—Asok Pal
Attorney, Agent, or Firm—Foley & Lardner

[57] ABSTRACT

Compositions are described based on hydrogen-containing fluorochlorohydrocarbons selected from the dichloropentafluoropropanes which contain defined amounts of specific surface-active substances selected from the group consisting of straight-chain alkylamines having 9 to 12 carbon atoms, straight chain carboxylic acids having 9 to 12 carbons atoms, branched alkylamines having 8 to 12 carbon atoms, branched carboxylic acids having 8 to 12 carbon atoms, alkyl phosphates, aryl phosphates, mixed alkyl/aryl phosphates, salts of the foregoing alkylamines with the foregoing carboxylic acids, and salts of straight-chain or branched C8- to C12-alkylamines with alkyl, aryl or mixed alkyl/aryl mono- or diesters of phosphoric acid. A process for using these compositions to remove water from surfaces of a wide variety of articles and from a wide variety of materials is also described.

11 Claims, No Drawings

DICHLOROPENTAFLUOROPROPANE-CONTAINING COMPOSITIONS FOR REMOVING WATER FROM SURFACES

BACKGROUND OF THE INVENTION

The present invention relates to compositions based on hydrogen-containing fluorochlorohydrocarbons selected from the group consisting of the dichloropentafluoropropanes, and to the use of these compositions for removing water from surfaces of a very wide variety of articles and from a very wide variety of materials.

In many machining and cleaning operations, for example in the electrical or electronics industry, the optical industry, and also, for example in the mechanical industry in the production of high-quality precision workpieces, articles come into contact with water or moisture, either intentionally or unintentionally. Water may therefore adhere (for example as a moisture film) to these articles. However, the presence of adhering water may have an adverse effect during further machining steps and/or on the serviceability and service life of the articles. It is therefore necessary for many articles to be completely freed from adhering water immediately after the machining or cleaning operations which involve the presence of water or even after mere contact with atmospheric moisture etc. before further processing or for correctly functioning use.

Such removal of water from articles is also referred to as drying. In the prior art, articles are dried by heating or by treatment with compositions ("drying compositions") comprising surface-active substances and certain solvents (such as, for example, hydrocarbons, acetone, alcohols or fully halogenated fluorochlorohydrocarbons). Since the articles to be dried can comprise a very wide variety of materials, for example plastics, glass, metals or combinations thereof, the drying processes and the drying compositions used for drying should be compatible with a wide range of materials. However, drying by heating represents an undesired, very high thermal load for the articles to be dried or is unsuitable for a wide range of materials due to the high temperatures to be used. In addition, stain-free drying is in many cases not possible in this way. In turn, the constituents in the drying compositions, in particular the solvent forming the principal component, should be inert toward a very wide range of different materials.

Although there have already been many attempts to provide drying compositions for various fields of use and for various materials, having the desired properties, such as, for example, a strong drying action, good drying quality or good inertness toward the articles to be dried, the known compositions are still, however, in need of improvement with respect to their applicational, toxicological and environmental properties. The high requirements for inertness, drying action and drying quality are not always met, or frequently only inadequately met, by the known compositions of the prior art. Alternatively, other known compositions contain relatively large amounts of solvents which are unacceptable for toxicological or safety reasons (i.e. have a low flash point). Other compositions contain solvent constituents which, due to their environmental properties, it is desirable to replace with other solvents that are at least equally suitable for the particular application. There remains therefore a need for new drying compositions which have improved properties and, in addition, are more acceptable with regard to toxicological and particularly environmental criteria.

SUMMARY OF THE INVENTION

It is the object of the invention to provide a composition for removing water from (i.e. drying) a surface of an article which overcomes the disadvantages of prior art compositions and is especially suitable for removing water from surfaces of articles.

These and other objects of the invention are achieved by providing a composition consisting essentially of 0.01 to 10% by weight surface-active component and the balance at least one compound selected from the group consisting of the dichloropentafluoropropanes, wherein the surface active component consists essentially of at least one surface-active substance selected from the group consisting of straight-chain alkylamines having 9 to 12 carbon atoms, straight chain carboxylic acids having 9 to 12 carbon atoms, branched alkylamines having 8 to 12 carbon atoms, branched carboxylic acids having 8 to 12 carbon atoms, alkyl phosphates, aryl phosphates, mixed alkyl/aryl phosphates, salts of the foregoing alkylamines with the foregoing carboxylic acids, and salts of straight-chain or branched C8- to C12-alkylamines with alkyl, aryl or mixed alkyl/aryl mono- or di-esters of phosphoric acid.

In accordance with another aspect of the invention, a process is provided for removing water from a surface of an article comprising the step of treating said surface with a dichloropentafluoropropane/surface-active component composition as described above.

DETAILED DESCRIPTION OF PREFERRED EMBODIMENTS

The invention proposes novel compositions which are distinguished on the one hand by a content of 99.99 to 90% by weight of a dichloropentafluoropropane or of a mixture of dichloropentafluoropropanes and 0.01 to 10% by weight of a surface-active substance or mixture of surface-active substances dissolved therein, the sum of the constituents being 100% by weight. A further characteristic of the compositions according to the invention is that the surface-active substance is selected from straight-chain alkylamines or carboxylic acids in each case having 9 to 12 carbon atoms, from branched alkylamines or carboxylic acids in each case having 8 to 12 carbon atoms, from alkyl, aryl, or mixed alkyl/aryl phosphates, from salts of the above alkylamines with the above carboxylic acids, or from salts of straight-chain or branched C8- to C12-alkylamines with mono- or diester alkyl, aryl, or mixed alkyl/aryl phosphates. As used herein, the term "aryl" is intended to include both unsubstituted aryl groups and aryl groups which are substituted by other groups such as alkyl groups.

In a preferred embodiment of the invention, the composition contains 99.95 to 95% by weight of the dichloropentafluoropropane and 0.05 to 5% by weight of the surface-active substance, the sum of the constituents being 100% by weight.

As used herein, the term "dichloropentafluoropropanes" refers to fluorochlorohydrocarbons carrying a single hydrogen atom and having the empirical formula $C_3HCl_2F_5$. These include, in particular, the incompletely halogenated, isomeric fluorochlorohydrocarbons 1,2-dichloro-1,1,2,3,3-pentafluoropropane, 2,3-dichloro-1,1,1,2,3-pentafluoropropane, 1,1-dichloro-2,2,3,3,3-pentafluoropropane (=3,3-dichloro-1,1,1,2,2-pentafluoropropane), 1,3-dichloro-1,1,2,2,3-pentafluoropropane, 1,1-dichloro-1,2,2,3,3-pentafluoropropane, 1,2-dichloro-1,1,3,3,3-pentafluoropropane, and 1,1-dichloro-1,2,3,3,3-pentafluoropropane. Preferred dichloropentafluoropropanes are 1,1-dichloro-2,2,3,3,3-pentafluoropropane (R225ca) and 1,3-dichloro-1,1,2,2,3-pentafluoropropane (R225cb).

The drying compositions of the invention contain specific surface-active substances which are soluble in the dichloropentafluoropropanes and simplify the displacement or removal of water by the dichloropentafluoropropane from the surfaces of the articles to be dried. Within the scope of the invention, these surface-active organic substances may be, for example, straight-chain alkylamines having 9 to 12 carbon atoms or branched alkylamines having 8 to 12 carbon atoms. Examples of preferred alkylamines include, in particular, nonylamine, tert.-octylamine and 2-ethylhexylamine. Other surface-active organic substances within the scope of the invention include, for example, aliphatic straight-chain C9- to C12-carboxylic acids or branched C8- to C12-carboxylic acids. Examples of preferred surface-active carboxylic acids include, in particular, isooctanoic acid, 2-ethylhexanoic acid, and nonanoic acid.

As used herein, the term "isooctanoic acid" refers to mixtures of isomeric, branched, aliphatic monocarboxylic acids having eight carbon atoms, which can generally be prepared by oxidation of oxo-aldehydes or oxo-alcohols.

The surface-active alkyl and/or aryl phosphates useful in the present invention include mono-, di- and tri-esters of phosphoric acid, i.e. phosphoric acid compounds in which one, two or all three hydroxyl groups of the phosphoric acid have been esterified by the same or different, unbranched or groups. Phosphoric acid esters of this type conform, for example, to the general formula $(R^1O)(R^2O)(R^3O)P=O$, wherein $R^1$ represents a straight-chain or branched C1- to C20-alkyl group, a C7- to C26-alkylphenyl group, or a phenyl group. In monoesters of phosphoric acid, $R^2$ and $R^3$ each represent hydrogen, and in triesters of phosphoric acid, $R^2$ and $R^3$ are independently selected from the same definition as $R^1$. In diesters of phosphoric acid, one of $R^2$ and $R^3$ is hydrogen and the other is as defined for $R^1$. Examples of preferred surface-active phosphoric acid ester compounds include, in particular, butyl phosphate, octyl phosphate, decyl phosphate, 2-ethylhexyl phosphate, di-(2-ethylhexyl) phosphate, didecyl phosphate, didodecyl phosphate, di(3,6-dioxapentadecyl) phosphate, tri(2-ethylhexyl) phosphate, tri-n-butyl phosphate, triphenyl phosphate, and diphenyl 2-ethylhexyl phosphate. Tri(2-ethylhexyl) phosphate, tri-n-butyl phosphate, triphenyl phosphate, and diphenyl 2-ethylhexyl phosphate are particularly preferred.

Another group of surface-active substances within the scope of the invention is the salts of a) the aforementioned alkylamines with b) the aforementioned carboxylic acids. Examples of these include, in particular, the salts nonylamine/isooctanoic acid, tert-octylamine/isooctanoic acid, nonylamine/2-ethylhexanoic acid, tert-octylamine/2-ethylhexanoic acid, nonylamine/nonanoic acid, and tert-octylamine/nonanoic acid. A further group of surface-active substances within the scope of the invention is the salts of straight-chain or branched C8- to C12-alkylamines with the aforementioned mono- or di-esters of phosphoric acid corresponding to the formula $(R^1O)(R^2O)(R^3O)P=O$ where $R^2$ is hydrogen. Examples of these include, in particular, salts of 2-ethylhexyl phosphate or di(2-ethylhexyl) phosphate with octylamine or nonylamine. Furthermore, the compositions of the invention may also contain mixtures of tri-esters of phosphoric acid with the aforementioned amines. Examples of such mixtures include mixtures of tri-n-butyl phosphate with octylamine or of triphenyl phosphate with 2-ethylhexylamine.

In an advantageous embodiment of the invention, the compositions contain as surface-active substances, a mixture of a) the surface-active alkylamine with b) the surface-active carboxylic acid or the surface-active phosphoric acid ester in an a:b molar ratio of from 0.3:0.7 to 0.55:0.45.

The compositions according to the invention described above are homogeneous, liquid compositions having an unusual activity for removing water from surfaces of articles. The invention therefore furthermore relates to a process of using such liquid compositions to remove water from surfaces of articles. In particular, the invention also relates to a process for removing water from surfaces of articles wherein the surfaces are treated with the aforedescribed compositions according to the invention.

The invention provides compositions which are particularly suitable for removing water from surfaces of solid articles. The surfaces to be treated, which may be moist, wet with water and/or covered with liquid water, can be freed very effectively from adhering water (i.e. dried) by the treatment with the compositions according to the invention. The surfaces can be brought into contact with the compositions according to the invention by spraying, brushing or some other way of applying the composition, by passing the composition over the surfaces or by immersing the articles into the composition. If immersion techniques are used, the composition can be agitated or stirred in a suitable manner or the action of the composition may be bolstered or augmented in some other manner, for example by application of ultrasonic energy.

The removal of the water can be carried out at temperatures ranging from above the solidification point of water up to the boiling point of the composition and/or the maximum temperature at which water remains in the liquid state. The treatment time is not particularly crucial, since a considerable amount of water is removed from the surfaces upon initial contact of the surfaces with the compositions according to the invention. For practical purposes, it is usually advisable for the surfaces to be dried to be in contact with the composition for about one minute, although longer or shorter times may also be used, depending on the particular surfaces of the material to be dried or the particular circumstances of the drying operation. If desired, the solid article may be rinsed after drying with fresh, liquid and/or vaporous fluorochlorohydrocarbon (preferably a dichloropentafluoropropane) and/or another non-aqueous solvent which is relatively inert toward the surfaces in order to remove any surface-active substances remaining on the surfaces. Finally, liquid fluorochlorohydrocarbon adhering after drying can, if desired, be removed from the surfaces of the articles by conventional techniques, for example by evaporation.

The compositions according to the invention satisfy all applicable criteria for good compositions for removing water from surfaces. Thus, they facilitate effective drying of articles made from a very wide variety of materials. They are equally suitable for articles made of metal, glass, flame-proof materials, precious stones, or conventional plastics. The removal of water takes place as quickly and completely as possible. The compositions do not form emulsions with water and facilitate rapid formation of separate water and solvent phases. This criterion is very important, since, if an emulsion is formed, on the one hand the water content in the composition increases, and on the other hand some of the composition could be discharged from the drying step with the water to be removed, thereby making phase separation of water and solvents more difficult. Finally, the compositions according to the invention are stable throughout a long period of application, i.e. the concentration of surface-active substances present in the dichloropentafluoropropane is only decreased to a minor extent or not at all. The surface-active substances are not extracted to any significant extent from the dichloropentafluoropropanes by the water to be removed, since the affinity of the dichloropentafluoropropanes toward the surface-active substances, particularly toward those which are preferably used, is greater than the affinity of water toward these surface-active substances. Furthermore, the compositions according to the invention do not have flash points.

The invention will be illustrated in further detail by the following examples which are not intended to limit the scope of the invention.

EXAMPLES

Drying experiments with articles made from a very wide variety of materials were carried out in a commercially available three-chamber drying apparatus. The three-chamber drying apparatus comprised a drying bath and two rinsing baths arranged successively in a cascade-like fashion following the drying bath. The second rinsing bath was provided with an overflow to the first rinsing bath, and the first rinsing bath was provided with an overflow to the drying bath. A common vapor space extended over the three baths and was provided at the top with a cooling zone for solvent condensation. The condensate condensed and collected in the cooling zone was recirculated into the second rinsing bath via a recycling line. All three chambers of the drying apparatus were additionally equipped with separate heating devices. The drying bath was connected via an overflow to a water separator in which the drying composition was separated from the water. After separation of the water, the drying composition was returned from the water separator to the drying bath by means of a pump via a recycling line.

For drying, the articles were first immersed in the drying bath containing boiling drying composition for 1 minute. After drying in the drying bath, the article to be dried was rinsed by immersion for 1 minute in each of the two rinsing baths, each containing boiling dichloropentafluoropropane. After remaining in the vapor phase for 1 minute, the article to be dried left the apparatus in an absolutely dry state and cool enough to be touched.

The drying bath and rinsing bath compositions, the drying conditions, the nature of the articles to be dried, and the drying results are reproduced in the following Table 1, in which the code R225ca denotes 1,1-dichloro-2,2,3,3,3-pentafluoropropane.

TABLE 1

| No. | Compositions | Drying Conditions | Material | Result |
|---|---|---|---|---|
| 1 | Drying bath 1<br>99.5% by weight of R225ca; 0.5% by weight of a surface-active substance consisting of iso-octanoic acid (0.6 mole) and tert-octylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |
| 2 | Drying bath 1<br>99.5% by weight of R225ca; 0.5% by weight of a surface-active substance consisting of iso-octanoic acid (0.6 mole) and nonylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |
| 3 | Drying bath 1<br>99.5% by weight of R225ca; 0.5% by weight of a surface-active substance consisting of 2-ethylhexanoic acid (0.6 mole) and tert-octylamine (0.4 mole)<br>Rinsing bath 2 and 3<br>R225ca<br>Vapor space 4 | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |

TABLE 1-continued

| No. | Compositions | Drying Conditions | Material | Result |
|---|---|---|---|---|
| 4 | R225ca<br>Drying bath 1<br>99.5% by weight of R225ca; 0.5% by weight of a surface-active substance consisting of 2-ethylhexanoic acid (0.6 mole) and nonylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |
| 5 | Drying bath 1<br>99.5% by weight of R225ca; 0.5% by weight of a surface-active substance consisting of nonanoic acid (0.6 mole) and tert-octylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |
| 6 | Drying bath 1<br>99.5% by weight of R225ca; 0.5% by weight of a surface-active substance consisting of nonanoic acid (0.6 mole) and nonylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |
| 7 | Drying bath 1<br>99.5% by weight of R225ca; 0.5% by weight of a surface-active substance consisting of tri-n-butyl phosphate (0.6 mole) and octylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |
| 8 | Drying bath 1<br>99.5% by weight of R225ca; 0.5% by weight of a surface-active substance consisting of tri-phenyl phosphate (0.6 mole) and 2-ethylhexylamine (0.4 mole)<br>Rinsing bath 2 and 3<br>R225ca<br>Vapor space 4<br>R225ca | 1) immersed for 1 minute, boiling<br>2) immersed for 1 minute, boiling<br>3) immersed for 1 minute, boiling<br>4) 1 minute residence time in the vapor space | a) glass lenses<br>b) silicon wafers<br>c) aluminum plates<br>d) plastic parts (polyethylene) | absolutely dry<br>absolutely dry<br>absolutely dry<br>absolutely dry |

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A composition consisting essentially of 0.01 to 10% by weight surface-active component and the balance at least one compound selected from the group consisting of the dichloropentafluoropropanes, wherein said surface active component consists essentially of at least one surface-active substance selected from the group consisting of straight-chain alkylamines having 9 to 12 carbon atoms, straight chain carboxylic acids having 9 to 12 carbon atoms, branched alkylamines having 8 to 12 carbon atoms, branched carboxylic acids having 8 to 12 carbon atoms, alkyl phosphates, aryl phosphates, mixed alkyl/aryl phosphates, salts of the foregoing alkylamines with the foregoing carboxylic acids, and salts of straight-chain or branched C8- to C12-alkylamines with alkyl, aryl or mixed alkyl/aryl mono- or diesters of phosphoric acid.

2. A composition according to claim 1, consisting essentially of 0.05 to 5% by weight of said surface-active component and the balance at least one compound selected from the group consisting of the dichloropentafluoropropanes.

3. A composition according to claim 1, wherein the dichloropentafluoropropane is 1,1-dichloro-2,2,3,3,3-pentafluoropropane (R225ca) or 1,3-dichloro-1,1,2,2,3-pentafluoropropane (R225cb).

4. A composition according to claim 1, wherein said surface active component is an alkylamine selected from the group consisting of nonylamine, tert.-octylamine, and 2-ethylhexylamine.

5. A composition according to claim 1, wherein said surface active component is a carboxylic acid selected from the group consisting of isooctanoic acid, 2-ethylhexanoic acid, and nonanoic acid.

6. A composition according to claim 1, wherein said surface active component is a phosphate ester selected from the group consisting of tri(2-ethylhexyl) phosphate, tri-n-butyl phosphate, triphenyl phosphate, and diphenyl 2-ethylhexyl phosphate.

7. A composition according to claim 1, wherein said surface-active component is a mixture of a) an alkylamine with b) a carboxylic acid or a phosphate ester in an a:b molar ratio of from 0.3:0.7 to 0.55:0.45.

8. A composition according to claim 7, wherein said alkylamine is selected from the group consisting of nonylamine, tert.-octylamine, and 2-ethylhexylamine.

9. A composition according to claim 7, wherein b) is a carboxylic acid selected from the group consisting of isooctanoic acid, 2-ethylhexanoic acid, and nonanoic acid.

10. A composition according to claim 7, wherein b) is a phosphate ester selected from the group consisting of tri(2-ethylhexyl) phosphate, tri-n-butyl phosphate, triphenyl phosphate and diphenyl 2-ethylhexyl phosphate.

11. A process for removing water from a surface of an article comprising the step of treating said surface with a composition according to claim 1.

* * * * *